(12) United States Patent
Tokorotani (10) Patent No.: US 7,970,650 B2
(45) Date of Patent: Jun. 28, 2011

(54) POS DEVICE

(75) Inventor: Mitsuhiro Tokorotani, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 57 days.

(21) Appl. No.: 12/362,042

(22) Filed: Jan. 29, 2009

(65) Prior Publication Data

US 2009/0198582 A1    Aug. 6, 2009

(30) Foreign Application Priority Data

Feb. 4, 2008    (JP) .................................. 2008-023530

(51) Int. Cl.
*G06Q 20/00*    (2006.01)
(52) U.S. Cl. ............ 705/17; 361/679.21; 361/27; 361/4; 361/6
(58) Field of Classification Search ........................ None
See application file for complete search history.

(56) References Cited

U.S. PATENT DOCUMENTS

| | | | | |
|---|---|---|---|---|
| 5,560,450 A | * | 10/1996 | Kouno | 186/61 |
| 6,009,461 A | * | 12/1999 | Yamano | 709/204 |
| 6,456,981 B1 | * | 9/2002 | Dejaeger et al. | 705/14.38 |
| 6,588,549 B2 | * | 7/2003 | Wike et al. | 186/61 |
| 7,472,459 B2 | * | 1/2009 | Lee et al. | 16/342 |
| 7,529,687 B1 | * | 5/2009 | Phan | 705/20 |

FOREIGN PATENT DOCUMENTS

| | | | | |
|---|---|---|---|---|
| JP | 6-133437 A | | 5/1994 | |
| JP | 10240819 A | * | 9/1998 | |
| JP | 2000-113334 A | | 4/2000 | |
| JP | 2001-290560 A | | 10/2001 | |
| JP | 2001-312368 A | | 11/2001 | |
| JP | 2002-230132 A | | 8/2002 | |
| JP | 2003-85647 A | | 3/2003 | |
| JP | 2003-275079 A | | 9/2003 | |
| JP | 2005107364 A | * | 4/2005 | |
| JP | 2005-352641 A | | 12/2005 | |
| JP | 2006-221236 A | | 8/2006 | |

* cited by examiner

*Primary Examiner* — Luna Champagne
(74) *Attorney, Agent, or Firm* — Sughrue Mion, PLLC (57) ABSTRACT

A POS device includes a rotation shaft vertically fixed, a rotary plate provided so as to be rotatable about the rotation shaft, a rotating portion placed on the rotary plate and having at least a barcode scanner and a receipt printer, and a display device for clerk and a display device for customer both provided at the top end of the rotation shaft.

11 Claims, 6 Drawing Sheets

POS DEVICE

This application is based upon and claims the benefit of priority from Japanese Patent Application No. 2008-23530, filed on Feb. 4, 2008, the disclosure of which is incorporated herein in its entirety by reference.

TECHNICAL FIELD

This invention relates to a POS device that automatically reads and registers information about purchased items.

BACKGROUND ART

In a recent retail store environment, there have been cases where the number of clerks is insufficient due to compression of labor cost and a decrease in population and where the goods cannot be sufficiently displayed for reasons of small area of a store. For reducing the number of clerks or shortening waiting time at the cashier counter, introduction of a self-service POS device in addition to a clerk POS device has been progressing. However, it is costly for a store to purchase two POS devices, i.e. the clerk POS device and the self-service POS device. Further, this requires the installation space to be twice or more and thus does not match the store environment. Moreover, in a time zone when there is no clerk in the store, the clerk POS device is unusable, i.e. being an unused installation, and thus is wasted.

As a technique for solving such a problem, there is, for example, a checkout system disclosed in Japanese Unexamined Patent Application Publication (JP-A) No. 2003-85647. This conventional system switches between a self-service POS device and a clerk POS device.

However, since this conventional system is configured such that a scanner and an LCD are movable independently of each other, the system configuration is complicated. Further, since two actions are required for switching between the self-service POS device and the clerk POS device, the speed for the switching is slow. Further, a receipt printer is required for printing receipts, but is not provided in this conventional system. Moreover, POP advertisements or the like are normally posted in stores, but, according to this prior art, since the size of the system is large and driving portions are located away from each other, it is not possible to place POP advertisements or the like therearound.

DISCLOSURE OF THE INVENTION

Therefore, this invention has been made in view of the above problems of the prior art and has an object to provide a POS device that is simple in structure and excellent in operability with high switching speed by sharing the single POS device.

In order to achieve the above object, according to this invention, there is obtained a POS device for automatically reading and registering information about a purchased item, which comprises a rotation shaft vertically fixed, a rotary plate provided so as to be rotatable about the rotation shaft, a rotating portion placed on the rotary plate and having at least a scanner and a printer, and a display device for clerk and a display device for customer provided at a top end of the rotation shaft.

According to this invention, by sharing a single POS device, it can be used as a POS device that is capable of clerk service when a clerk is present, and further can be used as a self-service POS device by rotating a pertinent portion of the device, for example, in a time zone when the number of clerks is small or in the case where a clerk is out for replenishing goods.

In this manner, according to this invention, a single device can be used as both a POS device adapted to be operated by a clerk (clerk-service POS) and as a self-type POS device adapted to be operated by a shopping customer himself or herself (self-service POS) so that the single POS device can have two functions for clerk service and self-service. This makes it possible to achieve a low cost and minimize the installation space.

DETAILED DESCRIPTION OF THE INVENTION

Now, an embodiment of this invention will be described with reference to the drawings.

Figure 1:
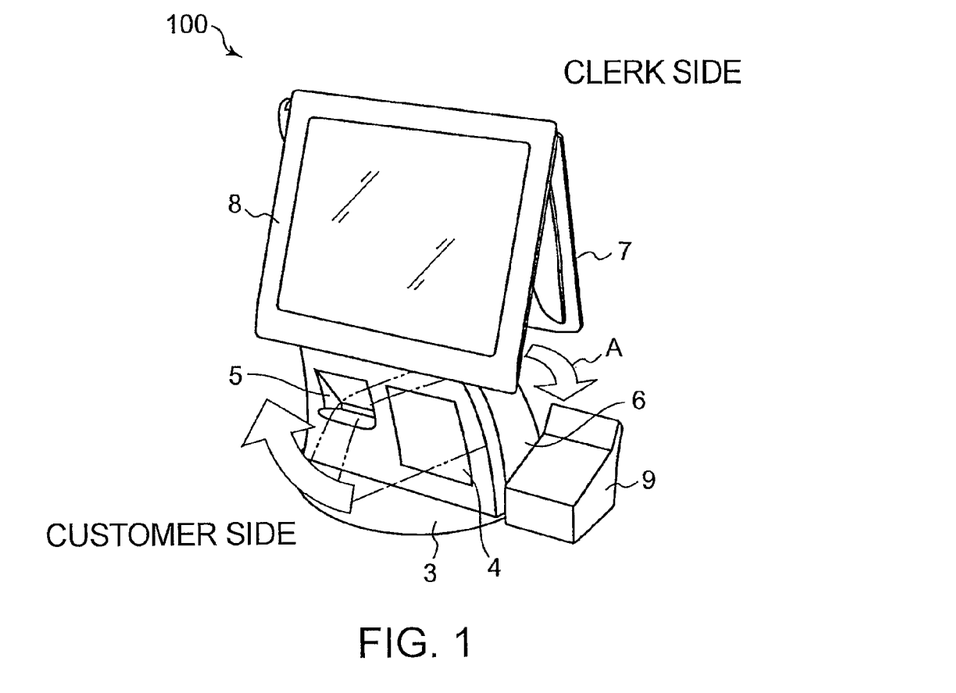
FIG. 1 is a schematic diagram illustrating a configuration of a POS device of this invention.
Figure 2:
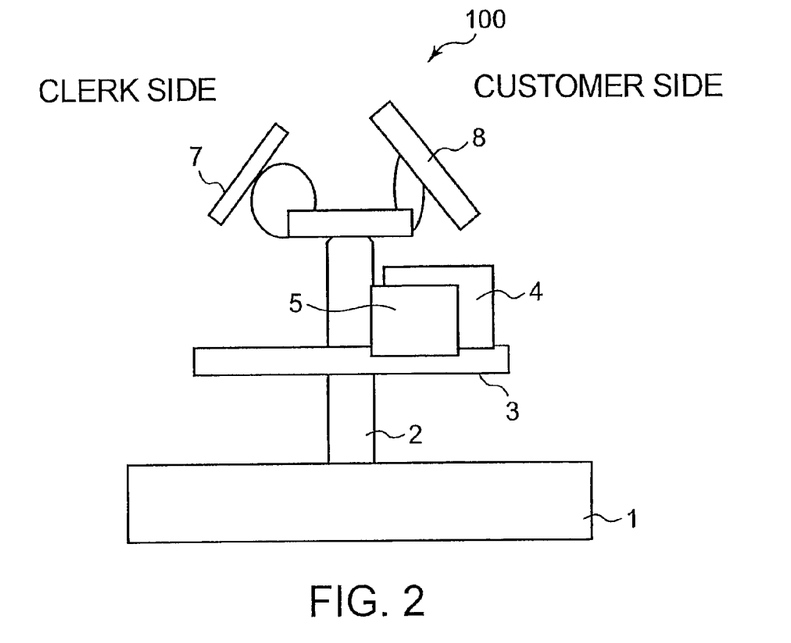
FIG. 2 is a side view illustrating a configuration of the POS device of this invention.

At first, referring to FIGS. 1 and 2, the configuration of a POS device of this invention will be described. FIG. 1 is a schematic diagram illustrating the configuration of the POS device of this invention. FIG. 2 is a side view illustrating the configuration of the POS device of this invention.

The POS device generally depicted by numeral 100 is a device for automatically reading and registering information about purchased items. The POS device 100 comprises a rotation shaft 2 vertically fixed on a desk 1, a rotary plate 3 disposed so as to be rotatable about the rotation shaft 2, a rotating portion 6 fixedly placed on the rotary plate 3 and having a barcode scanner 4 (stationary laser scanner) and a receipt printer 5, and a display device for clerk (hereinafter referred to as an "LCD 7") and a display device for customer (hereinafter referred to as an "LCD 8") both disposed at the top end of the rotation shaft 2. Further, a settlement terminal 9 is disposed on a lateral side of the rotating portion 6.

The rotary plate 3 is configured to be rotatable by 180 degrees about the rotation shaft 2 and thus the rotating portion 6 is adapted to rotate in an arrow A direction in FIG. 1. Herein, the LCD 7 and the LCD 8 are configured to be prevented from rotating.

The customer-side LCD 8 includes a mechanism for allowing input through a touch panel. A customer can register an item through the touch panel (which is used when buying a newspaper or the like with no barcode given). In addition, it is also possible to display information such as information about the place of origin of an item by operating the touch panel. The clerk-side LCD 7 also includes a touch panel and can perform item registration using it.

Figure 3A:
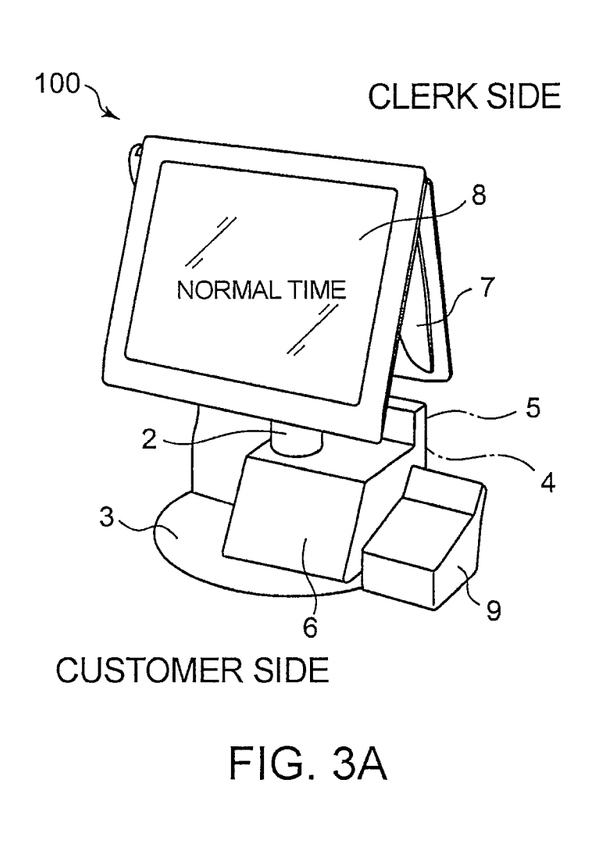
FIG. 3A is a diagram illustrating a schematic configuration of the POS device of this invention, wherein the POS device is in a state of clerk-service time.
Figure 3B:
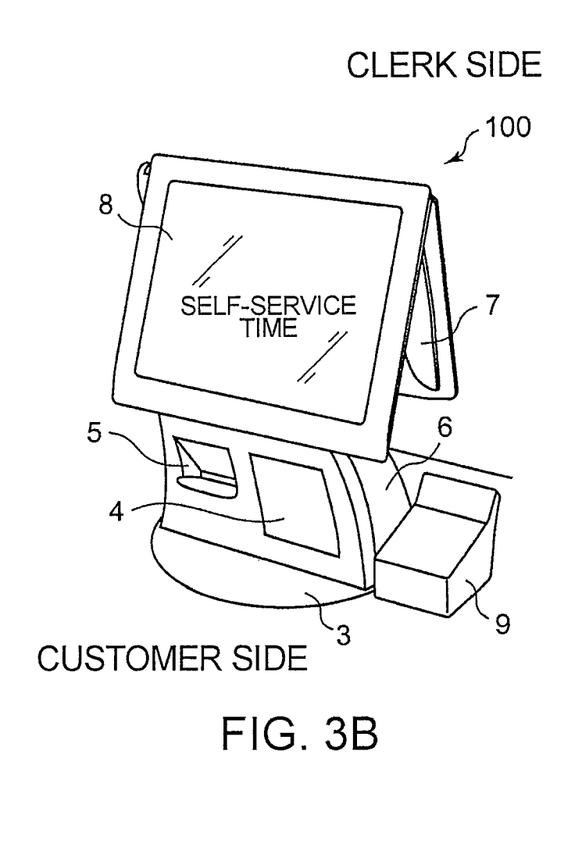
FIG. 3B is a diagram illustrating a schematic configuration of the POS device of this invention, wherein the POS device is in a state of self-service time.

FIG. 3A is a diagram illustrating a schematic configuration of the POS device 100, wherein the POS device 100 is in a state of clerk-service time (normal time). FIG. 3B is a diagram illustrating a schematic configuration of the POS device 100, wherein the POS device 100 is in a state of self-service time.

In clerk-service time, the receipt printer 5 and the barcode scanner 4 are facing the clerk side as shown in FIG. 3A and thus a customer cannot operate either the receipt printer 5 or the barcode scanner 4.

On the other hand, in self-service time, the receipt printer 5 and the barcode scanner 4 are facing the customer side as shown in FIG. 3B and thus a customer can operate the receipt printer 5 and the barcode scanner 4.

As described above, the receipt printer 5 and the barcode scanner 4 are facing the clerk side when a clerk performs a POS operation (accounting) (clerk service), while, when using the POS device 100 as a self-service POS, a customer himself or herself can operate the receipt printer 5 and the barcode scanner 4 by rotating the rotating portion 6 to cause the receipt printer 5 and the barcode scanner 4 to face the customer side. This enables the single POS device 100 to serve as a normal clerk-service POS terminal and a self-service POS terminal adapted for use by a customer.

Figure 4:
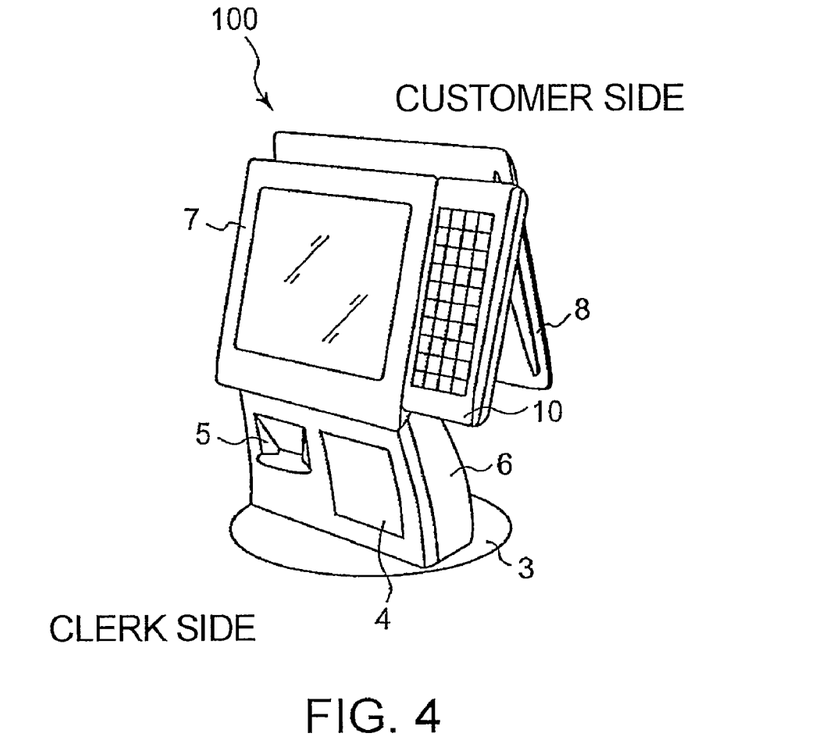
FIG. 4 is a diagram illustrating a configuration in which a POS keyboard is disposed on a lateral side of a clerk-side LCD.

FIG. 4 illustrates a configuration in which a POS keyboard 10 is disposed on a lateral side of the clerk-side LCD 7.

In FIG. 4, when a clerk inputs an amount of money, received from a customer, using the POS keyboard 10 disposed on the lateral side of the LCD 7, the POS device 100 calculates an amount of change and displays it on the clerk-side LCD 7 and the customer-side LCD 8. Herein, since customers are often unfamiliar with keyboard operation, the POS keyboard 10 is provided only on the clerk side in this embodiment.

Figure 5:
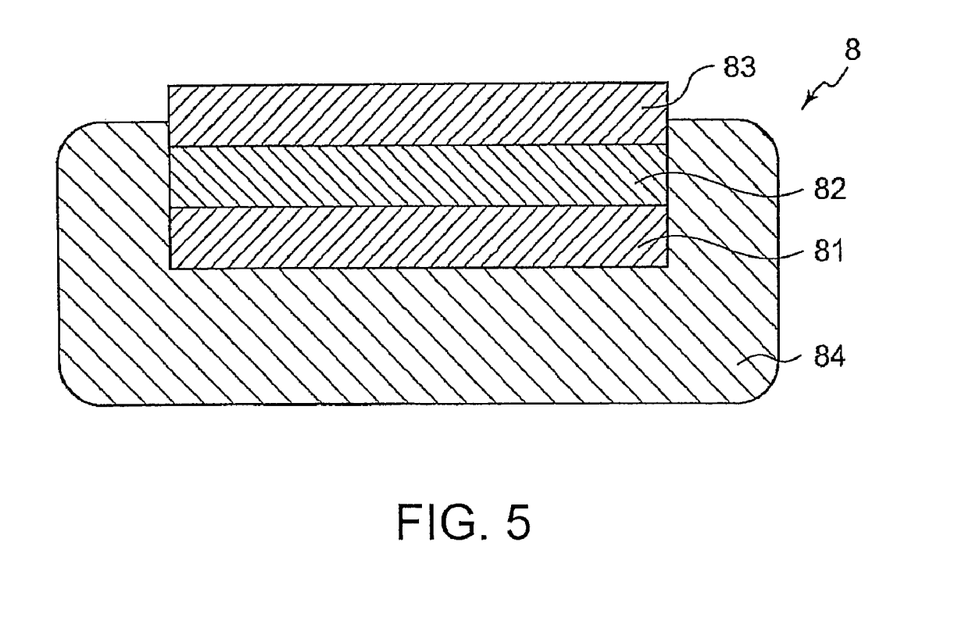
FIG. 5 is a sectional view illustrating a structure of a customer-side LCD.

Referring now to FIG. 5, the structure of the customer-side LCD 8 will be described.

As shown in FIG. 5, a polarizing film 82 is provided on an LCD surface 81. Further, a touch panel surface 83 is provided on the polarizing film 82. The LCD surface 81, the polarizing film 82, and the touch panel surface 83 are incorporated in a housing 84. Since the polarizing film 82 is provided in this manner, peeping from oblique directions is made difficult to thereby achieve the protection of privacy. Since the touch panel surface 83 is provided at the forefront, a customer is allowed to perform a touch-panel operation.

EXAMPLE

Now, an example of this invention will be described with reference to FIGS. 6 and 7.

Figure 6:
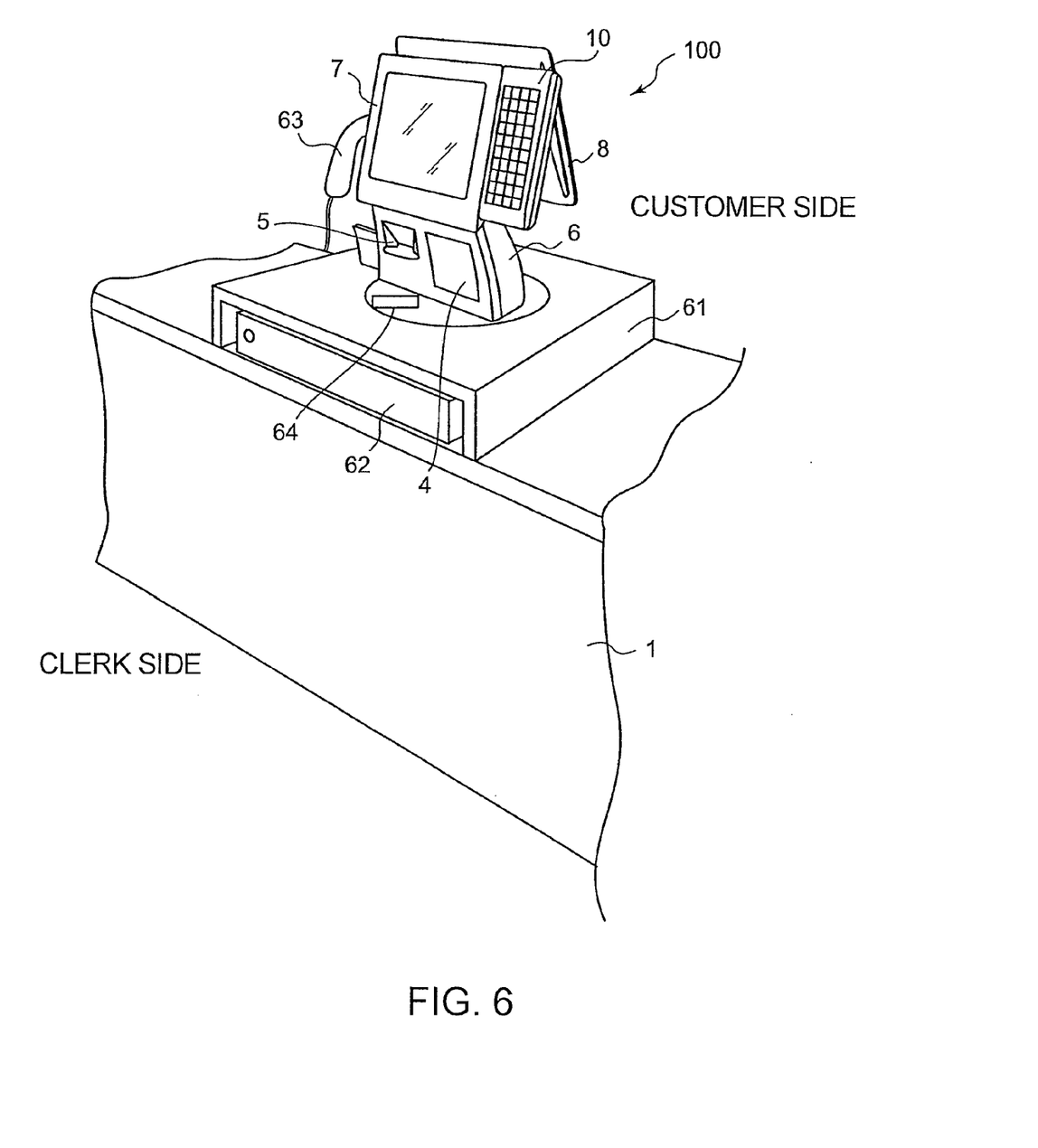
FIG. 6 is a diagram illustrating a specific configuration of a POS device in clerk-service time.

FIG. 6 is a diagram illustrating a specific configuration of a POS device 100 in clerk-service time. FIG. 7 is a diagram illustrating a specific configuration of the POS device 100 in customer-service time. Herein, the same reference numerals are assigned to the same constituent portions as those in FIGS. 1 to 4.

The POS device 100 is installed on a base 61 disposed on a desk 1. The base 61 is provided with a cash drawer 62 for keeping money for change and received money. The cash drawer 62 is connected to the POS device 100. The POS device 100 is provided with a barcode hand scanner 63. The barcode hand scanner 63 is a handheld scanner for assisting a stationary barcode scanner 4. The barcode hand scanner 63 is not used in self-service time. This is because, normally, customers unfamiliar with handheld scanner operation do not use the barcode hand scanner 63. The barcode hand scanner 63 is secondarily used for an item such as a box lunch (if inclined, soup or sauce may ooze out) or a large-size item.

A rotary plate 3 is provided with a switch 64 adapted to control the rotation of the rotary plate 3. The switch 64 has a locking mechanism so that the rotary plate 3 is fixed and prevented from rotating unless the switch 64 is pressed. When rotating the rotary plate 3, a clerk presses the switch 64 as a rotation permission button provided on the clerk side and then the rotary plate 3 is rotated. This makes it possible to prevent that a customer arbitrarily rotates the rotary plate 3. As shown in FIG. 7, plastic shopping bags 70 are provided at the front of the desk 1 on the customer side.

Referring to FIG. 6, the operation in clerk-service time will first be described.

At first, a customer brings items to be purchased to the POS device 100. Then, a clerk registers the items in the POS device 100 using the barcode scanner 4 or the barcode hand scanner 63. In the case of an item with no barcode given, the clerk registers it in the POS device 100 through a touch panel.

As a result, the subtotal amount (finally the total amount) of the items is displayed on a clerk-side LCD 7 and a customer-side LCD 8. On the customer-side LCD 8, it is also possible to display information such as advertisements in addition to item details. Further, it is also possible to enhance customers' convenience by displaying information such as a slot game or peripheral route guidance on the customer-side LCD 8.

When the total amount is displayed, the customer pays it. For the payment, there is cash settlement or electronic settlement. In the case of the cash settlement, the clerk inputs a received amount of money using a POS keyboard 10 and confirms an amount of change. Then, the cash drawer 62 is opened and the clerk puts in and out the received money and the change. Then, a receipt printer 5 prints out a receipt. The clerk puts the purchased items in a plastic shopping bag and hands the bag to the customer along with the receipt and the change.

In the case of the electronic settlement, when the clerk presses an electronic settlement button (using either the touch panel or the keyboard) at the time of the payment, a settlement terminal 9 starts to operate so that the settlement is carried out. The clerk puts the purchased items in a plastic shopping bag and hands the bag to the customer along with a receipt.

In the case of self-service, a receipt merely serves as a detailed statement, while, in the case of clerk service, a receipt is used such that a clerk places coins (change) collectively on the receipt and hands them to a customer. In the latter case, the receipt also serves as a wrapping sheet for collecting the change coins. In this example, the receipt can be used as the wrapping sheet as usual in clerk-service time and can also be used as the detailed statement in self-service time.

Figure 7:
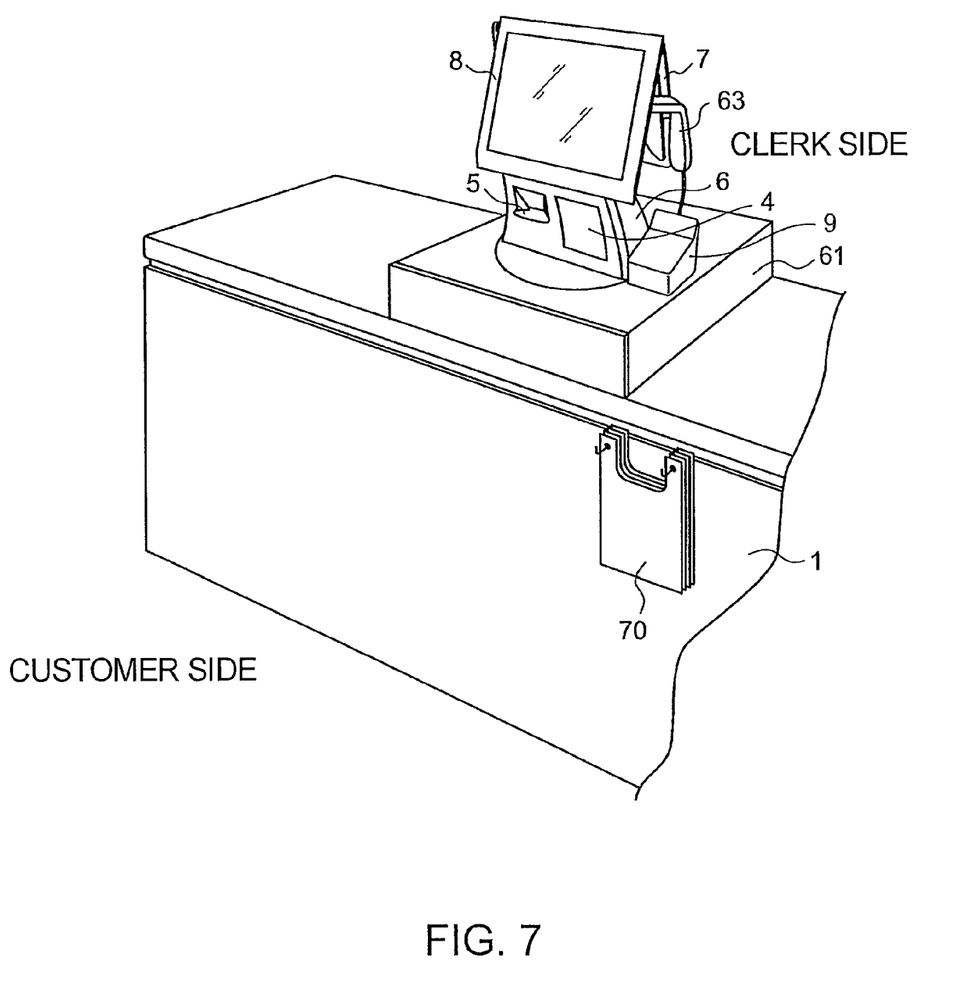
FIG. 7 is a diagram illustrating a specific configuration of the POS device in customer-service time.

Referring now to FIG. 7, the operation in self-service time will be described.

At first, the rotary plate 3 is rotated to cause the receipt printer 5 and the barcode scanner 4 to face the customer side, thereby enabling a customer to operate the receipt printer 5 and the barcode scanner 4.

In this state, a customer brings items to be purchased to the POS device 100. Then, the customer places a settlement card (or a card-loaded device such as a mobile wallet) on the settlement terminal 9. Upon recognizing that the settlement card is placed thereon, the settlement terminal 9 sends a start signal to the POS device 100.

Upon receipt of this signal, the POS device 100 causes the barcode scanner 4 to emit a laser beam so that the barcode scanner 4 is ready to read a barcode. The laser beam of the barcode scanner 4 is normally turned off. This is for preventing children or the like from looking into the laser beam in self-service time. Accordingly, the laser beam is initially turned off and is caused to be emitted when the POS device 100 is used.

When a barcode is placed close to the barcode scanner 4, it reads the barcode so that a corresponding item is registered. In this event, an operation method is displayed on the screen of the customer-side LCD 8 to thereby inform the customer of the operation sequence. A newspaper or the like with no barcode given is input for registration by operating a touch panel of the LCD 8.

Since the POS device 100 is provided with a loudspeaker (not illustrated), a sound is produced through the loudspeaker when the touch panel is operated, thereby notifying the customer that the input is successful. Simultaneously with this, a list of purchased items is displayed on the customer-side LCD 8 and thus the customer can also make confirmation using this list. Further, it is also possible to assist the operation of the customer by outputting voice messages such as "May I help you?", "Please do not forget your baggage.", and so on from the loudspeaker.

Every time an item is registered, the subtotal is calculated and displayed on the customer-side LCD 8. In the case where the settlement card for electronic settlement is of the prepaid type, if the subtotal amount exceeds the balance, it is also possible to notify the customer of "insufficient balance". In this case, the item concerned may be cancelled or the settlement card may be charged to increase the balance in a place where a clerk is present.

When the registration of the items has been finished, the customer presses a "registration finish" button (touch panel) on the customer-side LCD 8. Alternatively, if the next item registration is not performed even after the lapse of a preset time from the last item registration, the POS device 100 judges that the registration of all the items concerned has been finished, and shifts to a settlement operation.

In the settlement operation, a deduction service is performed by the operation of the settlement terminal 9 so that the settlement is completed. Simultaneously with this, a receipt is printed out from the receipt printer 5. The customer receives the receipt, puts the purchased items in a plastic shopping bag 70, and then leaves there. Herein, since there are many customers who do not require the issuance of a receipt from the receipt printer 5, a "receipt issue" button may be provided on the touch panel of the customer-side LCD 8 for selection by a customer to print/not print a receipt.

There are buttons on the touch panel, such as buttons for newspapers, for registration of items to be purchased. For these selection items, the positions or shapes of the buttons may be changed depending on times of the day or days of the week. For example, an application may be designed so that buttons for evening papers are arranged at the most conspicuous positions in the evening or buttons for weekly magazines are changed to showy buttons on the date of issue.

Further, since a customer can be individually identified when a settlement card is initially placed on the settlement terminal 9, item buttons may be changed depending on service points or customers for facilitating use thereof.

Further, since the barcode scanner 4 and the receipt printer 5 are disposed on the rotary plate 3, the operation (item traffic line) is efficient. For example, a purchased item moves from the right to the left while facing the POS device 100, i.e. the item is first placed on the right side and then is scanned by the barcode scanner 4 and placed on the left side. When all the items are scanned and placed on the left side, the receipt printer 5 prints out a receipt. In this event, since the receipt printer 5 is located on the left side, a clerk (clerk-service time) or a customer (self-service time) also moves from the right to the left along the item traffic line and finally can perform the operation at a position close to the receipt printer 5. This is realized by the configuration in which the barcode scanner 4 and the receipt printer 5 are disposed on the rotary plate 3 and thus are rotatable.

Figure 8:
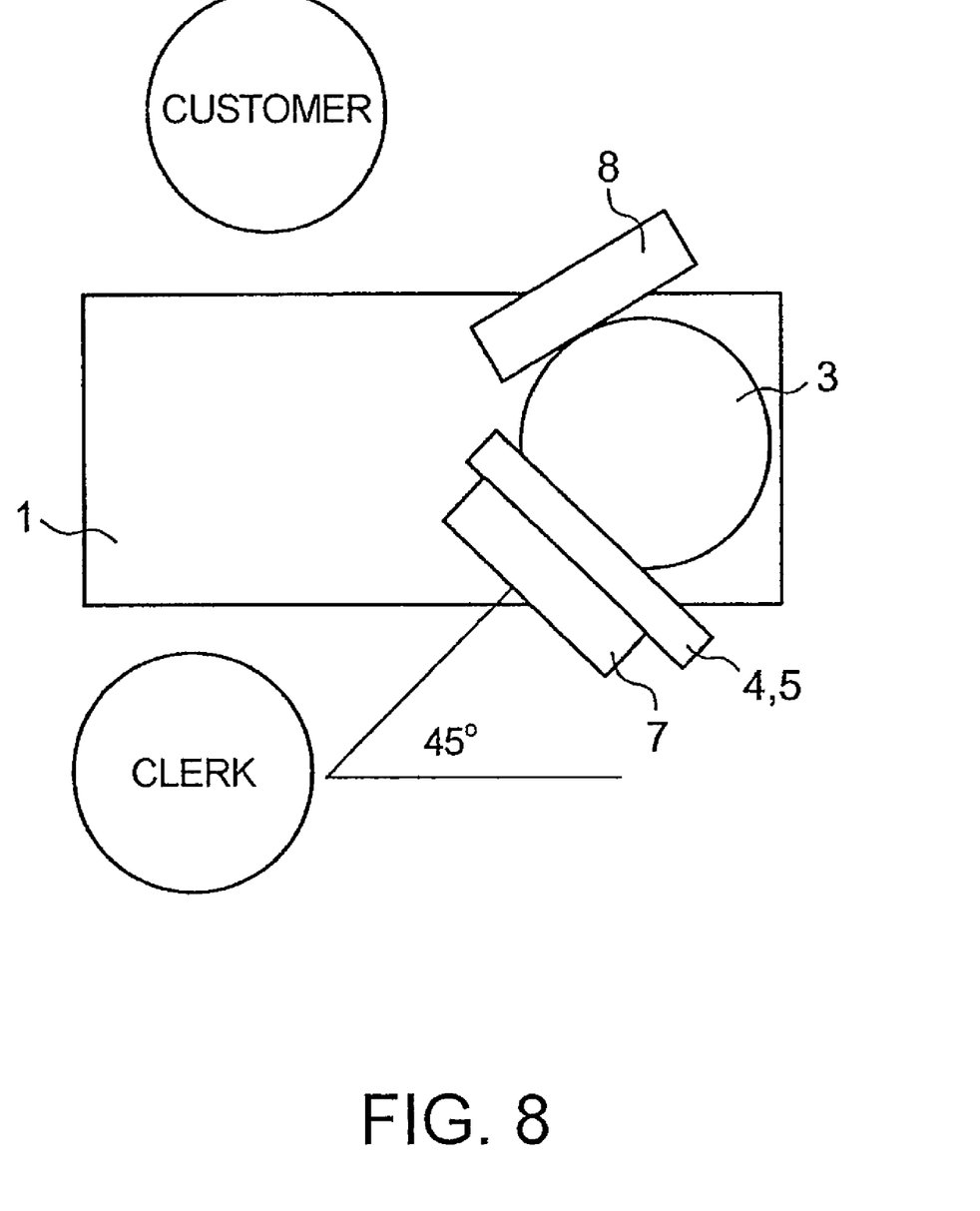
FIG. 8 is a top view illustrating a state where a receipt printer and a barcode scanner are stopped at an angle of 45 degrees.

In this example, it is also possible to realize, for example, a using manner as shown in FIG. 8. Herein, FIG. 8 is a top view illustrating a state where the receipt printer 5 and the barcode scanner 4 are stopped at an angle of 45 degrees.

Although the operation from the right to the left is ideal as the item traffic line as described above, when the store space is extremely narrow, the configuration shown in FIG. 8 becomes necessary. That is, as shown in FIG. 8, the receipt printer 5 and the barcode scanner 4 are stopped at an angle of 45 degrees. The LCDs 7 and 8 are generally designed to be capable of swiveling laterally and thus are also stopped in a state of being swiveled by 45 degrees in FIG. 8.

With this configuration, the POS device 100 is located at the obliquely right front of a clerk. In the case of a right-handed person, the POS device 100 can be operated by a right hand and, further, since a customer is present right in front of the clerk, it is possible to improve the customer service. Further, since the clerk is not required to move from the right to the left, the motion of the clerk can be minimized. Further, since the customer-side LCD 8 can also be swiveled to a position where a customer can easily see the screen thereof, the customer can check an item amount or the like on the LCD 8.

As described above, according to the example of this invention, the following effects can be achieved.

First, since the POS device 100 is configured to be sharable in clerk-service time and self-service time by providing the mechanism (rotation shaft 2 and rotary plate 3) for rotating the components (barcode scanner 4 and receipt printer 5) that are used in both clerk-service time and self-service time, the single POS device 100 can be used for both clerk service and self-service. As a result, the cost compression and the installation space reduction (only the single POS device is required instead of two devices) can be achieved.

Second, since only the necessary portion (rotating portion 6) is configured to be rotatable, the device is compact and even a female clerk can easily rotate the device. Therefore, for example, there is no occurrence of hitting against ornaments in a store. Further, the POS keyboard 10 not used by a customer is disposed on the lateral side of the clerk-side LCD 7 and is configured to be prevented from rotating, thereby achieving the compact configuration.

Third, in self-service time, since it is possible to display customer's operating behavior on the clerk-side LCD 7, a clerk can watch what operation is performed by a customer. This allows the single clerk to watch a plurality of POS devices. As a result, the labor cost can be compressed and, further, although a conventional POS device is idle unless a clerk is present, the POS device 100 can also be used as a self-register and thus it is also possible to shorten waiting time at the cashier counter.

Fourth, since the customer-side LCD 8 is provided with the polarizing film 82 as shown in FIG. 5, it is difficult for others to see what items are purchased by a customer at the time of settlement, thereby enhancing the security.

Fifth, it is also possible to display information such as advertisements in addition to item details and further possible to display information such as a slot game or peripheral route guidance on the customer-side LCD 8. Therefore, it is also possible to facilitate acquisition of repeat customers.

Sixth, in self-service time, a laser beam of the barcode scanner 4 is controlled so that the laser beam emission timing is determined using, as a reference time point, a time point when a settlement card is placed on the settlement terminal 9. Therefore, it is possible to reduce the danger of children or the like playing pranks and looking into a laser beam and, simultaneously, to contribute to energy saving.

Seventh, in self-service time, since a settlement card is initially placed on the settlement terminal 9, it is possible to check whether or not the subtotal amount exceeds the balance and thus to reduce the payment error.

Eighth, in self-service time, by changing the positions of item buttons on the touch panel to conspicuous positions depending on times of the day, days of the week, seasons, or the like, a customer can easily locate a target button.

Ninth, in self-service time, since the POS device 100 can initially recognize information of an electronic settlement card through the settlement terminal 9, the positions of item buttons on the touch panel can be changed depending on customers. For example, it is possible to make item buttons for every-time purchasing weekly magazines conspicuous and thus to further improve the facilitation of use.

Tenth, since the rotation of the rotary plate 3 is controllable by providing the switch 64 as shown in FIG. 6, a customer cannot arbitrarily operate the rotary plate 3.

While the invention made by the present inventor has been described in detail based on the example, it is needless to say that this invention is not limited thereto, but various changes may be made within the scope not departing from the gist of the invention.

For example, although it is considered to employ the 12-inch size for the clerk-side LCD 7 and the 15-inch size for the customer-side LCD 8, the sizes of the LCDs 7 and 8 are not questioned in this invention.

Further, the POS device 100 comprises the rotatable portions and the non-rotatable portions as shown in FIGS. 1 and 2, but depending on the circumstances, the POS device 100 may be configured to be rotatable in its entirety. In this case, a single LCD may be used instead of the LCDs 7 and 8 to achieve a further cost reduction.

Further, as shown in FIG. 1, the rotary unit includes the barcode scanner 4 and the receipt printer 5, but in addition thereto, things normally arranged around the POS device 100, such as plastic shopping bags, sponge, Cellotape (registered trademark), chopsticks, and straws, may also be rotated.

Further, the rotary plate 3 may be configured to be rotatable by more than 180 degrees about the rotation shaft 2. For example, when there is a pillar in an installation place of the POS device 100, the rotary plate 3 may be configured to be rotatable by about 200 degrees in order to avoid the pillar. Depending on the circumstances, the rotary plate 3 may be configured to be rotatable by less than 180 degrees.

Further, the barcode hand scanner 63 shown in FIG. 6 is provided only on the clerk side because customers are unfamiliar with this type of scanner, but depending on the circumstances, it may be placed on the rotary plate 3 so as to be usable by customers. Likewise, with respect to the POS keyboard 10 on the clerk side, it may also be placed on the rotary plate 3 so as to be usable by customers depending on the circumstances.

Further, in the example of this invention, the POS device 100 is dedicated for electronic settlement in self-service time. However, a unit such as an automatic change-making machine may be connected to the POS device 100 so as to be used for cash settlement or used as a charging function for electronic settlement.

What is claimed is:

1. A POS device for automatically reading and registering information about a purchased item, comprising:
   a rotation shaft vertically fixed;
   a rotary plate provided so as to be rotatable about the rotation shaft;
   a rotating portion placed on the rotary plate and having at least a scanner and a printer; and
   a display device for clerk and a display device for customer provided at a top end of the rotation shaft,
   wherein the printer and the scanner are caused to face a clerk side in a clerk operating time and face a customer side in a customer operating time by rotating the rotary plate by a predetermined angle, and
   wherein the display device for clerk and the display device for customer are configured to be prevented from rotating.

2. The POS device according to claim 1, wherein at least one of the display device for clerk and the display device for customer has a touch panel.

3. The POS device according to claim 1, wherein the display device for clerk is provided with a keyboard for inputting an amount of money received from a customer.

4. The POS device according to claim 1, wherein the rotary plate is provided on a clerk side with a switch adapted to control rotation of the rotary plate.

5. The POS device according to claim 4, wherein the switch has a locking mechanism so that the rotary plate is fixed due to operation of the locking mechanism unless the switch is pressed, while, when the switch is pressed, the locking mechanism is released to allow the rotary plate to rotate.

6. The POS device according to claim 1, wherein a settlement terminal is disposed adjacent to the rotating portion and, at a time point when a settlement card of a customer is placed on the settlement terminal and recognized in the customer operating time, a laser beam is emitted from the scanner so that the scanner can read a barcode given to the purchased item.

7. The POS device according to claim 6, wherein a touch panel of the display device for customer displays an item button by changing a position or a shape of the item button depending on customer information stored in the settlement card.

8. The POS device according to claim 1, wherein the display device for clerk displays an operating state of a customer.

9. The POS device according to claim 1, wherein the scanner is a barcode scanner and the printer is a receipt printer.

10. The POS device according to claim 1, wherein the display device for customer is an LCD having a polarizing film.

11. The POS device according to claim 1, wherein the scanner and the printer are stopped at an angle of 45 degrees.

* * * * *